United States Patent
Kobayashi

[11] Patent Number: 5,953,302
[45] Date of Patent: Sep. 14, 1999

[54] RECORDED MEDIUM PLAYBACK DEVICE WITH REMOVABLE PANEL AND HAVING A LEVER CONTACTING PANEL AND DETECTION SWITCH

[75] Inventor: Shigetoshi Kobayashi, Tokyo, Japan

[73] Assignee: Clarion Co., Ltd., Tokyo, Japan

[21] Appl. No.: 08/863,802

[22] Filed: May 27, 1997

[30] Foreign Application Priority Data

May 27, 1996 [JP] Japan .................................... 8-132025

[51] Int. Cl.[6] .............................. G11B 33/02; H04B 1/03
[52] U.S. Cl. .......................................... 369/75.1; 361/814
[58] Field of Search ................................ 369/75.1, 75.2, 369/77.1, 77.2; 361/814, 826, 681

[56] References Cited

U.S. PATENT DOCUMENTS

5,493,479  2/1996  Takahashi .............................. 361/814
5,705,976  1/1998  Howard .................................. 340/426

*Primary Examiner*—George J. Letscher
*Attorney, Agent, or Firm*—Koda & Androlia

[57] ABSTRACT

A recorded medium player used in, for example, an automobile for playing a compact disk, a cassette tape, etc. including a pivot lever installed near the front face of the player so that a first end of the lever located inside the player turns on a detection switch when a second end of the lever located outside of the player is contacted by a detachable front panel member when the panel member is mounted on a panel holder that is pivotally installed on the front face of the player. The detection switch is turned off so as to switch off the power of the player when the panel member is removed from the panel holder and the second end of the lever is released from the panel member.

5 Claims, 7 Drawing Sheets

RECORDED MEDIUM PLAYBACK DEVICE WITH REMOVABLE PANEL AND HAVING A LEVER CONTACTING PANEL AND DETECTION SWITCH

BACKGROUND OF THE INVENTION

1. Field of the Invention

The present invention relates to a recorded medium playback device for playing recorded media such as cassette tapes, compact disks, and the like and more particularly to a recorded medium playback device provided with a detachable panel member that contains a device operation section.

2. Prior Art

Generally, vehicle-mounted recorded medium playback devices such as car stereos, etc., are installed near the driver's seat; as a result, the area allowed for the operating panel of the playback devices is extremely limited. In this limited area, an operating/control circuit and a display circuit, as well as operating/control and display circuits for the radio tuner function, etc. are installed in addition to an insertion opening (slot) for recorded media such as cassette tapes and compact disks (hereafter collectively referred to as "CD's").

Accordingly, in some recorded medium playback devices, an operating section and a display which displays the operating states of various functions, etc., are installed on a front cover which closes the recorded medium insertion slot, thus increasing the area that can be used for the installation of various parts of the playback device.

Such recorded medium playback devices are often pulled out of the console panel and stolen when the driver is absent from the vehicle. In the past, devices have been proposed which include a detachment mechanism for allowing the front cover to be detached from the main body of the device. One example of such a recorded medium playback device (a CD player) is shown in FIGS. 10 and 11.

Figure 10:
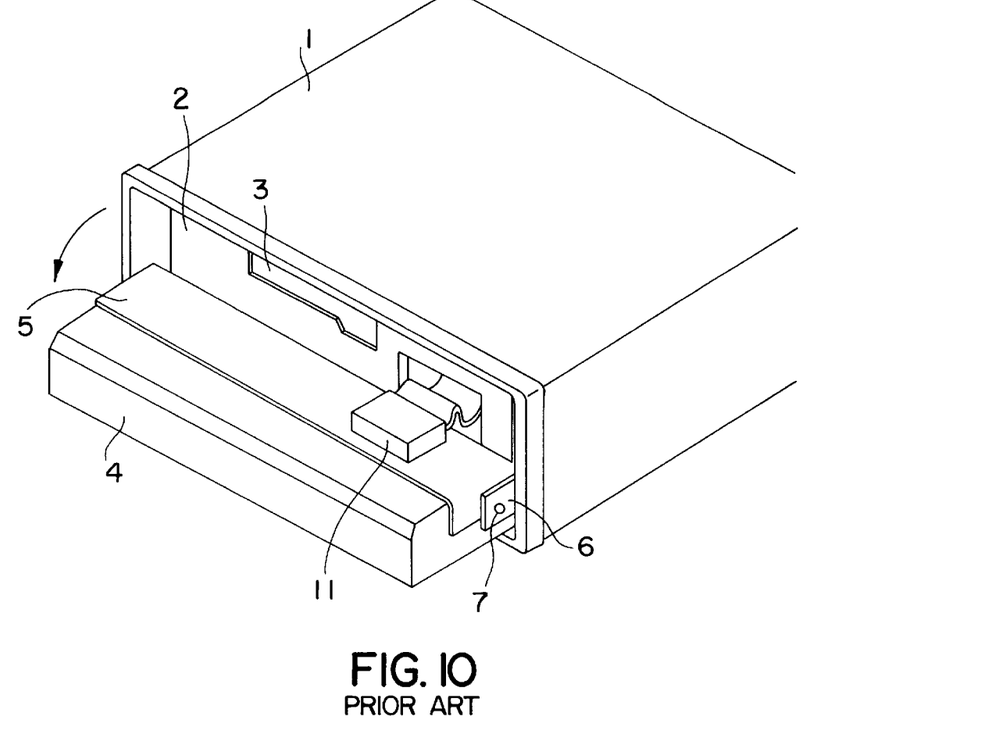
FIG. 10 is a perspective view of a conventional recorded medium playback device.
Figure 11:
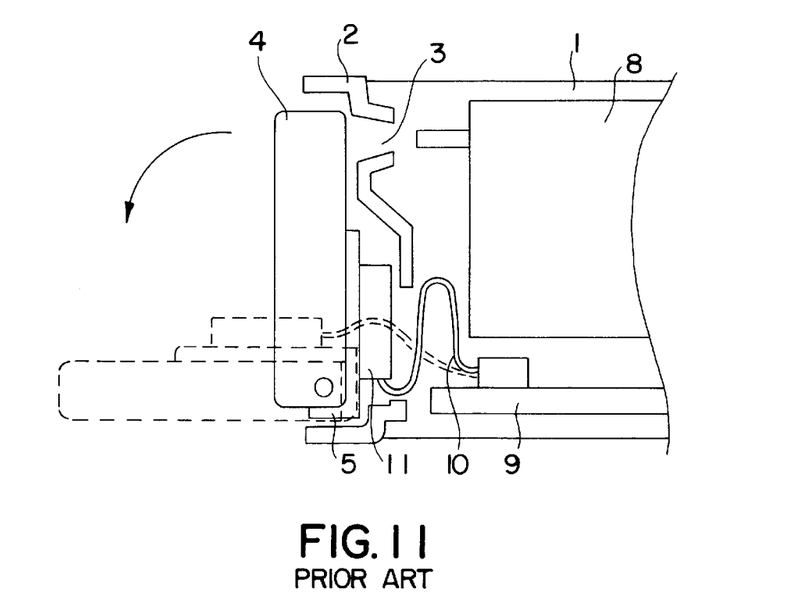
FIG. 11 shows a longitudinal cross section of the conventional recorded medium playback device of FIG. 10.

In FIG. 10, the main body 1 of the CD player is detachably installed in an accommodating space formed in the dashboard of a vehicle. An inner escutcheon 2 formed on the front face of the main body 1 is exposed to the outside of the accommodating space, and an insertion opening 3 into which a CD is inserted is formed in the inner escutcheon 2. In addition, a panel member 4 which covers the insertion opening 3 is disposed on the main body 1.

Although not shown in FIG. 10, an operating section, which includes an ON/OFF switch that controls the power supply and various operating switches that are used for the playback operation of a CD, and a display screen, which displays the operating state according to various operations, are installed on the front surface of the panel member 4.

A panel holder 5 is formed on the inner side of the panel member 4. The panel holder 5 is a rectangular steel plate and is pivotally attached (at one end with respect to the direction of the shorter side thereof) to a support pin 7 which is fastened to the lower portion of the inner escutcheon 2 via a bracket 6, so that the panel holder 5 covers the entire face of the inner escutcheon 2 located below the insertion opening 3. The panel member 4, on the other hand, is a hollow rectangular housing which is made of, for instance, plastic and is attached to the panel holder 5 in a detachable manner.

As shown in FIG. 11, the main body 1 of the recorded medium playback device includes a CD mechanism part 8 which takes in and plays back a CD inserted through the insertion opening 3 and a mother board 9 on which a control circuit for the recorded medium playback device is installed.

In the recorded medium playback device of the panel dismountable type, the operating section installed on the panel member 4 needs to be electrically connected to the mother board 9.

Accordingly, a connector 11 is employed for this purpose. The connector 11 is mounted on the panel holder 5 and is connected to the mother board 9 and to a connector (not shown) installed on the panel member 4. The connector 11 is connected to the mother board 9 by a flexible cable (or lead wires) 10.

When the panel member 4 is removed from the panel holder 5, in other words, when the connector on the panel member 4 and the connector 11 on the panel holder 5 are electrically separated, the power supply is switched off; and when the panel member 4 is put back on the panel holder 5, the power is supplied to the panel member 4 via the connector 11.

However, in the conventional recorded medium playback device described above, a flexible cable 10 and other similar parts are required in order to connect the connector 11 to the mother board 9. This causes an increase in the cost of required parts. Furthermore, as seen from FIG. 11, a space is necessary for installing the flexible cable 10 and other parts. Accordingly, the layout of the CD mechanism part 8 tends to be restricted. Furthermore, the depth dimension of the main body 1 tends to increase by an amount that corresponds to the space required for the flexible cable 10, etc.

SUMMARY OF THE INVENTION

Accordingly, the object of the present invention is to solve the problems seen in the prior art; in other words, the object of the present invention is to provide a recorded medium playback device which prevents the increase of the parts costs, and in which the depth of the device can be shortened.

In order to accomplish the object, the recorded medium playback device of the present invention is characterized by the fact that in a recorded medium playback device which includes:

a main body case which has an insertion opening formed in its front face so that a recorded medium is inserted therethrough, the main body being further provided with a playback mechanism therein which plays back the recorded medium, a panel member which has an operating section installed on its front face for operating the playback mechanism, the panel member covering the front of the main body case, and a panel holder provided with an anchoring member that anchors the panel member, the panel holder being pivotally supported on the front face of the main body case so that the panel member can be opened and closed in front of the main body case, and the recorded medium playback device further includes:

a detection switch installed inside the main body case and detects the attachment or detachment of the panel member with respect to the panel holder by means of an ON/OFF action, and a lever pivotally installed in the main body case, one end of the lever contacting the panel member anchored to the anchoring member of the panel holder and another end of the lever contacting the detection switch, the lever pivoting when the panel member is anchored to the anchoring member of the panel holder so that one end of the panel member contacts the lever and another end of the lever switches the detection switch.

With this structure, when the panel member is anchored to the anchoring member of the panel holder, one end of the lever comes into contact with the panel member; and as a result, the lever pivots so that the other end of the lever actuates the detection switch; and because of this action, the fact that the panel member has been placed on the panel holder is detected. In other words, as long as the panel member is in contact with the lever, the detection switch can remain its ON or OFF state.

Accordingly, the power supply of the playback mechanism can be switched on and off in accordance with the ON/OFF changes in the detection switch. For example, when the detection switch is ON, it is determined that the panel member is mounted, and the power supply is switched ON while the detection switch is ON, regardless of the opened or closed position of the panel member. On the other hand, when the detection switch is OFF, it is determined that the panel member has been removed, and therefore, the power supply is switched OFF. Accordingly, even if the panel member is opened so that a recorded medium such as a CD can be inserted or removed, the detection switch remains ON as long as the panel member is not removed, so that there is no switching OFF of the power supply.

As seen from the above, since the power supply is switched OFF when the panel member is removed from the panel holder, there is no need to use a connector in the panel holder in order to connect the panel member electrically with the power supply inside the main body case as seen in the prior art. Thus, there is no need to provide a connecting element to connect the connector, thus the cost for necessary parts (connecters, etc.) can be reduced, and the depth dimension of the main body of the playback device can be shortened.

Furthermore, in the recorded medium playback device of the present invention, the lever is screw-fastened so as to be pivotable in the horizontal direction about a screw.

Accordingly, when the panel member is mounted on the mounting member of the panel holder, one end of the lever contacts the panel member so that the lever pivots. Thus, the other end of the lever switches the detection switch ON, and thus the fact that the panel member is anchored in the panel holder is detected.

Still further, in the recorded medium playback device of the present invention, the lever can be slidably provided in the horizontal direction.

With this structure, when the panel member is mounted on the mounting member of the panel holder, one end of the lever contacts the panel member so that the lever slides in the horizontal direction. Thus, the other end of the lever switches the detection switch ON, and thus the fact that the panel member is installed in the panel holder is detected.

In addition, in the recorded medium playback device of the present invention, a projection is formed on one end of the lever so that the projection contacts the panel member while the panel member is anchored to the anchoring member of the panel holder, regardless of the pivoting motion of the panel holder.

Accordingly, the projection formed on the lever contacts the panel member while the panel member is anchored on the anchoring member of the panel holder. Furthermore, since the projection contacts the panel member regardless of the pivoting motion of the panel holder (i. e., regardless of the opened or closed position of the panel member), the power supply remains ON as long as the panel member is on the panel holder.

DETAILED DESCRIPTION OF THE INVENTION

In FIGS. 1, 2, 3 and 4, elements corresponding to those in FIGS. 10 and 11 are labeled with the same symbols, and a detailed description of these elements is omitted.

Figure 2:
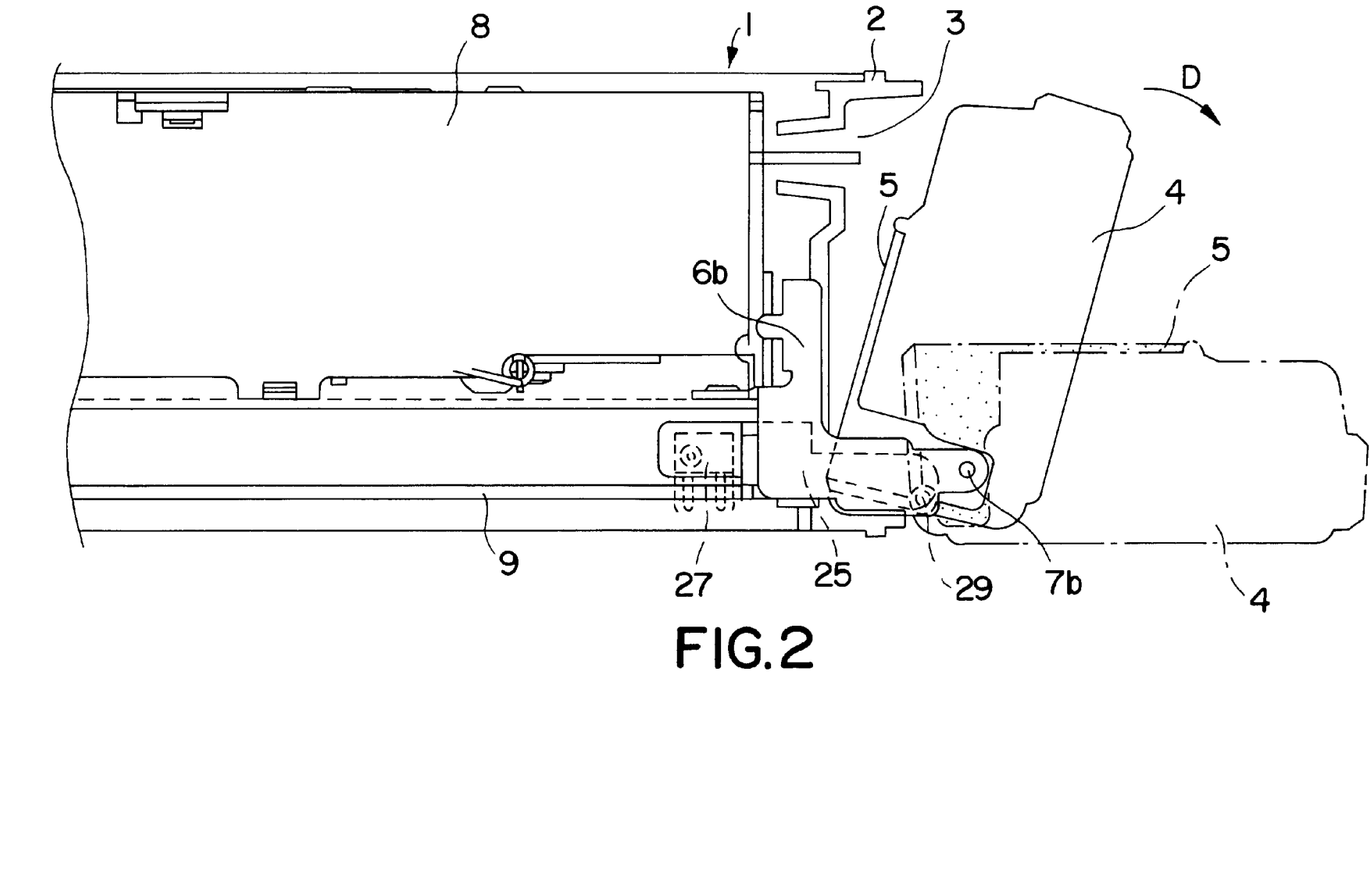
FIG. 2 is a longitudinal cross section illustrating the construction of the recorded medium playback device of Figure 1.
Figure 3:
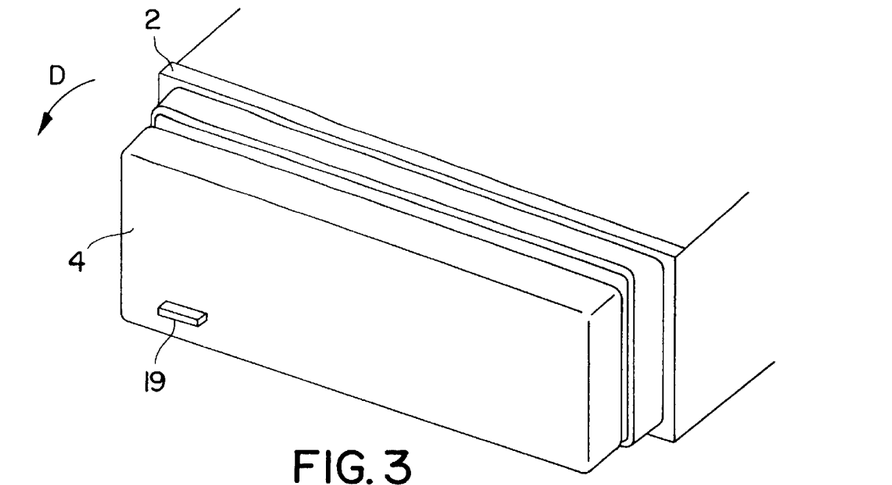
FIG. 3 is a perspective view of the recorded medium playback device of FIG. 1 with the panel member closed.

As seen from FIG. 2, a CD mechanism part 8 and a mother board 9 are installed inside a main body 1 in the same manner as in a conventional device. The panel member 4 is provided so as to cover the insertion opening 3 and inner escutcheon 2 of the main body 1 as shown in FIG. 3. The panel member 4 is detachable from the main body 1 as seen from FIG. 4.

A connector of the type shown in FIGS. 10 and 11 is not used for the panel holder 5. In this embodiment, the connector which connects the mother board 9 and the operating section of the panel member 4 is, though not shown, installed on the back surface of the inner escutcheon 2 and directly connected to the mother board 9.

Figure 4:
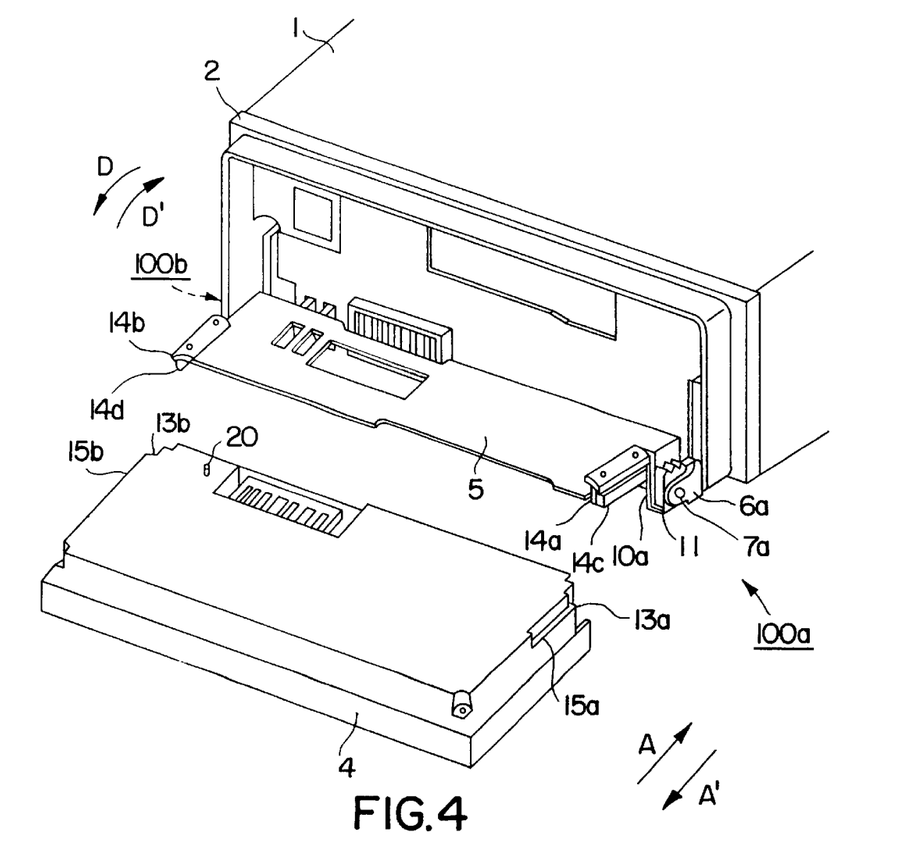
FIG. 4 is a perspective view showing the recorded medium playback device of FIG. 1 with the panel member removed.

As shown in FIG. 4, an L-shaped anchoring member 10a is provided on one of two shorter side edges (right side edge in FIG. 4) of the rectangular panel holder 5, and a bracket 6a is provided on the lower edge section of the inner escutcheon 2 of the main body 1 so as to positionally correspond to (or face) the anchoring member 10a. A support pin 7a is fastened in place by the anchoring member 10a and bracket 6a, and a fan-shaped gear 11 is disposed on the support pin 7a. The fan-shaped gear 11 is linked to a gear mechanism (not shown) installed inside the main body 1 so that the panel holder 5 is pivotable in the direction of arrows D and D' by the support pin 7a which is rotated by the fan-shaped gear 11. The anchoring member 10a, bracket 6a, support pin 7a and fan-shaped gear 11 (along with other elements now shown) described above form a first pivot support 100a for the panel holder 5.

Figure 5:
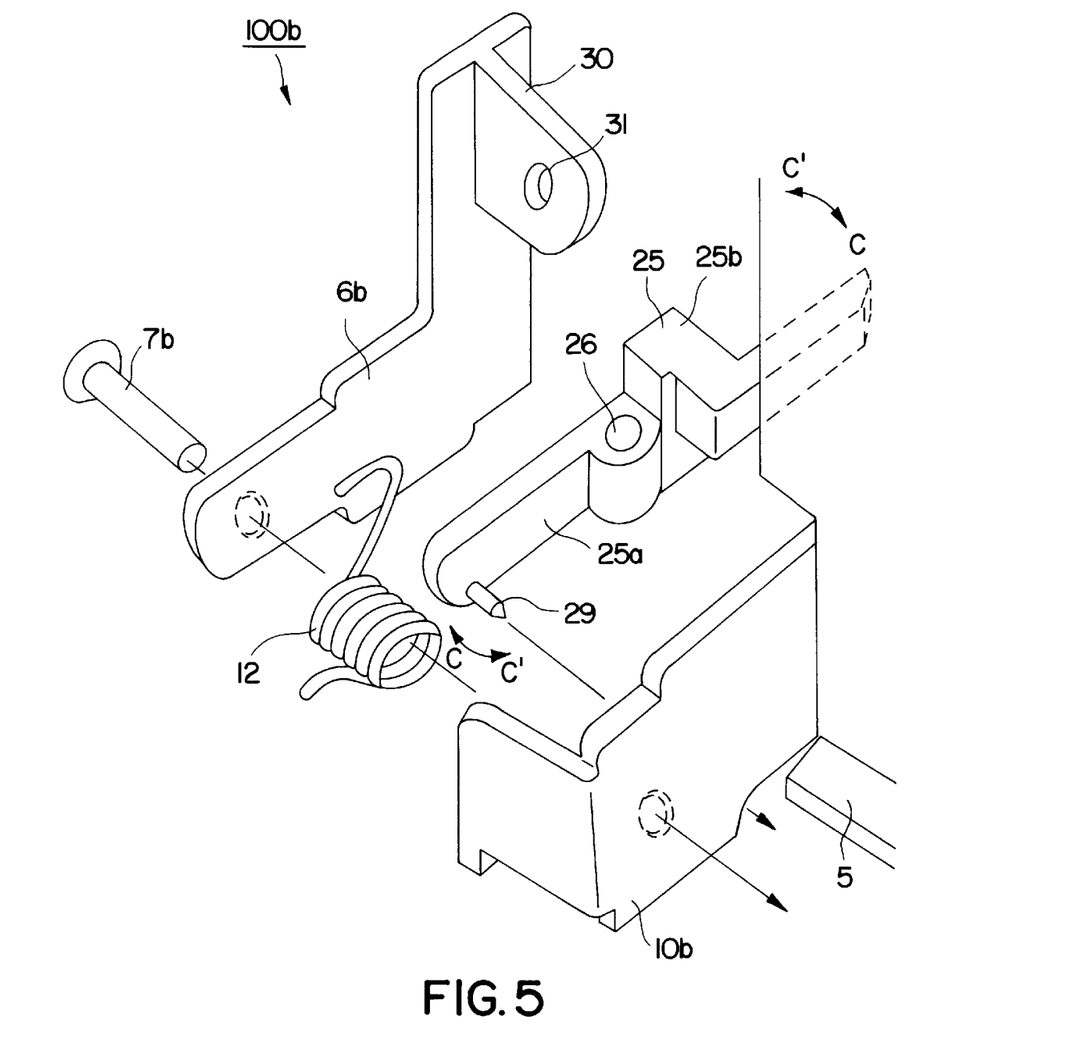
FIG. 5 is an enlarged exploded perspective view illustrating the second pivot support used in the embodiment of FIG. 1.
Figure 6:
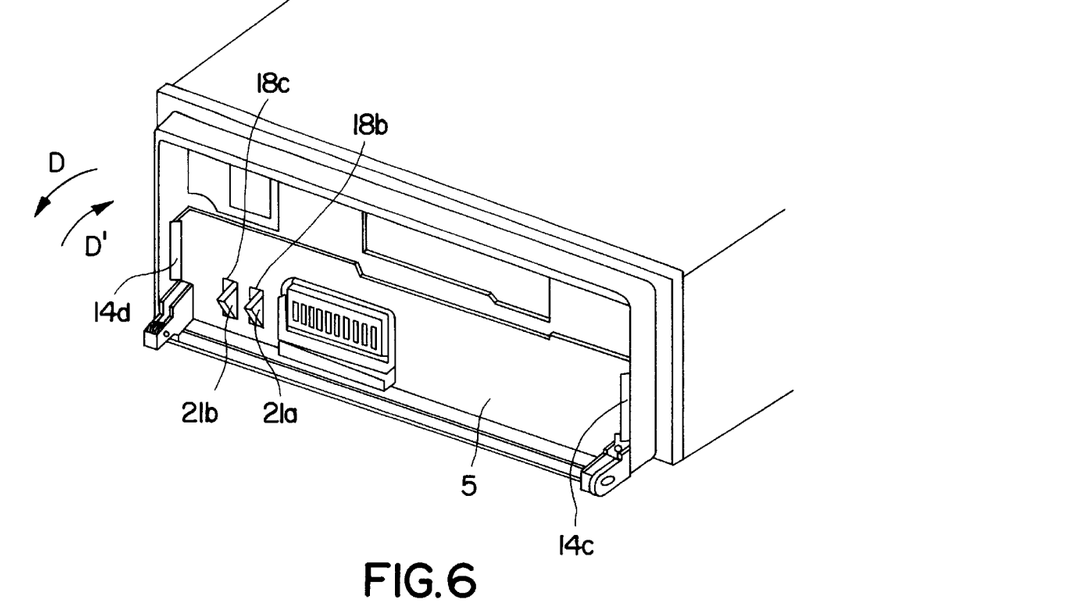
FIG. 6 is a perspective view of the main body of the recorded medium playback device of FIG. 1 with the panel holder in its raised position.

FIG. 5, an exploded perspective illustration, shows the detail of a second pivot support 100b which is installed on another end (left side edge in FIG. 4) of the panel holder 5. In FIG. 5, the panel holder 5 has been pivoted toward the main body 1 (or raised) as shown in FIG. 6.

The second pivot support 100b includes a bracket 6b which is substantially L-shaped and has an ear 30. The ear 30 of the bracket 6b projects perpendicularly from the bracket 6b so as to be on the upper end portion of the bracket 6b. The bracket 6b is provided on the inner escutcheon 2 by a screw (not shown) that is screw-engaged with a screw hole 31 of the ear 30.

Figure 1:
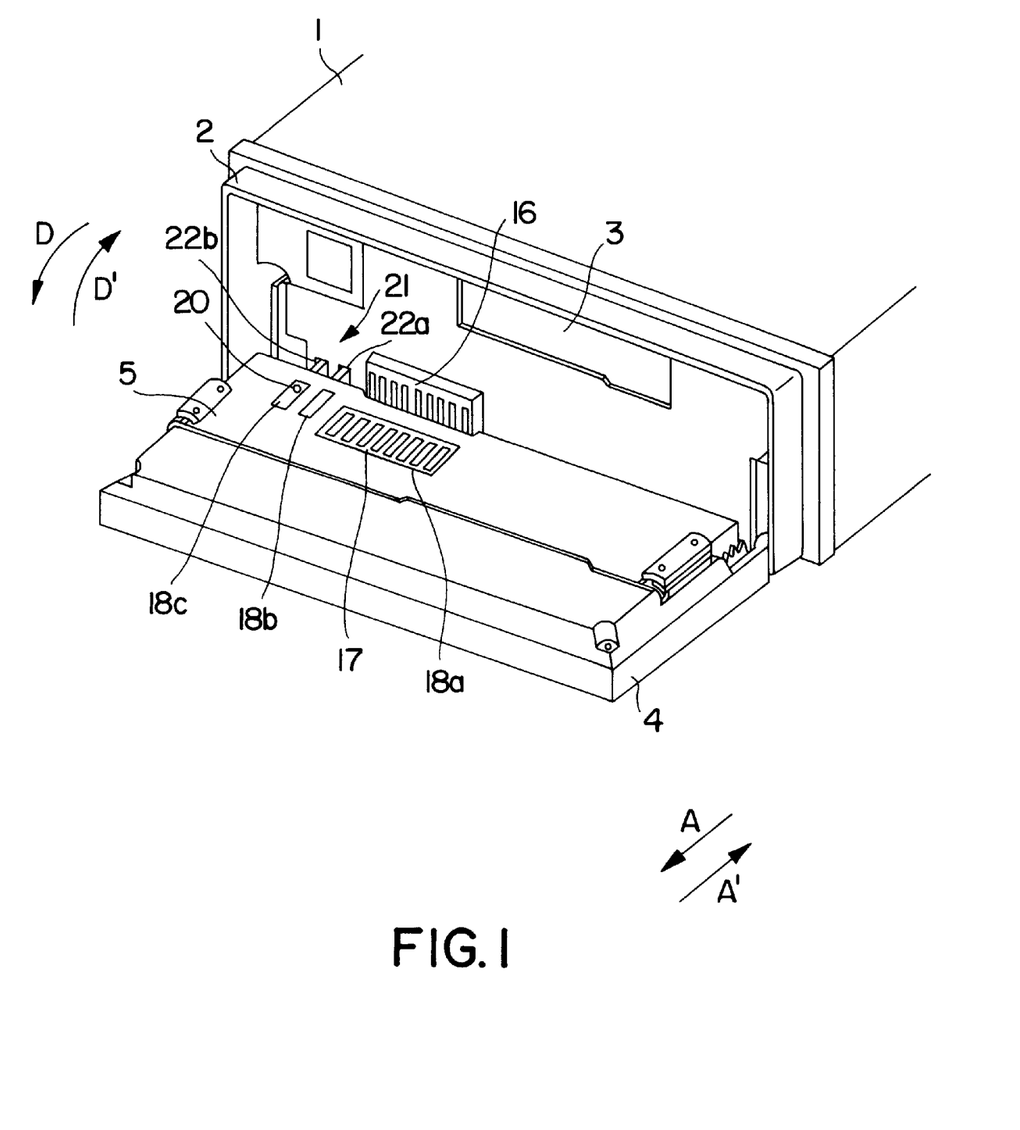
FIG. 1 is a perspective view showing the recorded medium playback device according to one embodiment of the present invention.

A support pin 7b is fastened in place by the bracket 6b and anchoring member 10b, and a coil spring 12 is mounted on this support pin 7b. The spring 12 keeps the panel holder 5 opened by its spring force as shown in FIG. 1.

Furthermore, a lever 25 is provided in the main body 1 so that it can pivot in the direction of arrows C and C' by a screw (not shown) that is screwed into a hole 26 made in the lever 25. The lever 25 has a front portion 25a and a rear portion 25b. The front portion 25a is located on the panel member 4 side and extends to the vicinity of the spring 12 from a point located roughly beneath the ear 30 of the bracket 6b; and the rear portion 25b, which is roughly L-shaped, is located on the main body 1 side and formed so as to be above the front portion 25a and extends toward the back of the main body 1.

Figure 7:
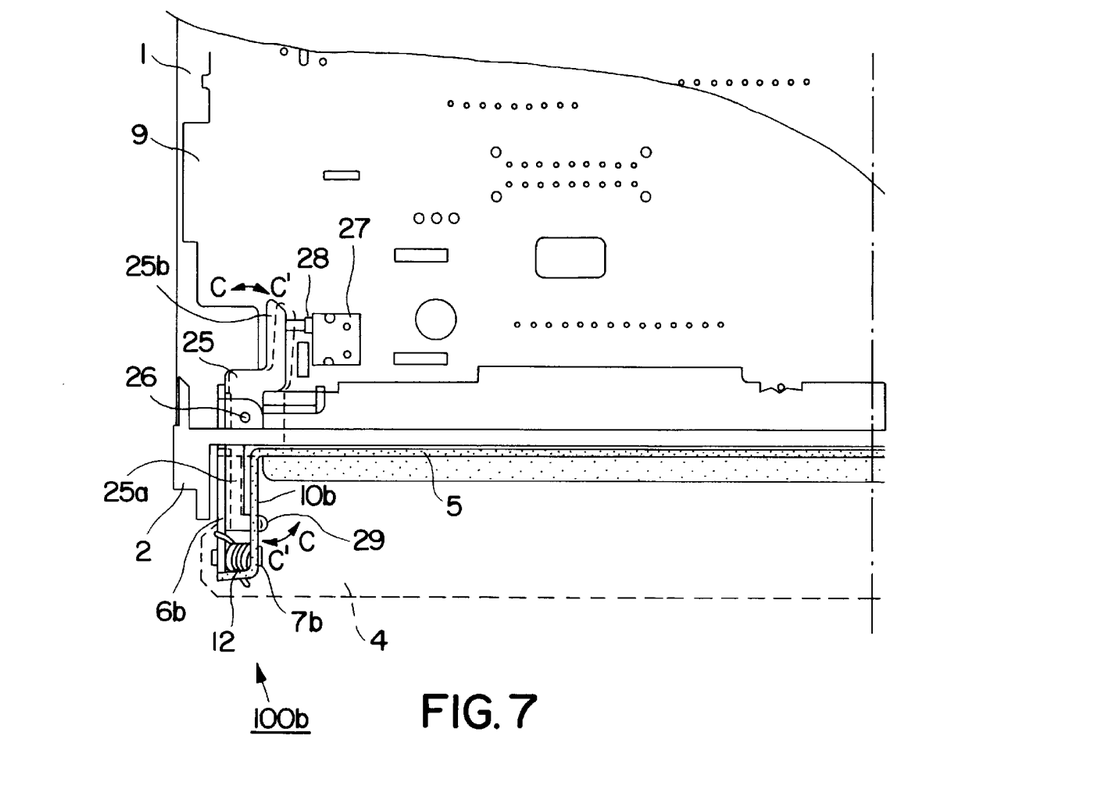
FIG. 7 is a top view of the construction of the second pivot support in the embodiment of FIG. 1.

FIG. 7 shows the top view of the second pivot support 10b. As seen from FIG. 7, the lever 25 is ordinarily in the position shown by the solid line; and when a force is applied in the direction of arrow C', the lever 25 pivots in the direction of arrow C' and moves into the position shown by the broken line.

A detection switch 27 is provided in the main body 1 and near the vicinity of the rear portion 25b of the lever 25. The detection switch 27 has a switch probe 28 that faces the rear portion 25b of the lever 25. Accordingly, when the lever 25 pivots in the direction of arrow C', it presses the switch probe 28 so that the detection switch 27 is switched ON; and when the lever 25 pivots in the direction of arrow C, it releases the switch probe 28 so that the detection switch 27 is switched OFF.

Back to FIG. 5, a projection 29 which extends in a perpendicular direction with respect to the lever 25 is formed on the lower portion of this front portion 25a of the lever 25 so as to be located on the panel member 4 side. The projection 29 protrudes into the inner side (right side) of the lower portion of the anchoring member 10b. As shown in FIG. 2, the projection 29 is maintained in the same position with respect to the anchoring member 10b, even though the panel holder 5 and panel member 4 pivot in the direction of arrow D. Accordingly, as will be described later, the projection 29 always protrudes to the inner side (right side in FIG. 5) so as to contact the panel member 4 mounted on the panel holder 5.

Furthermore, as seen from FIG. 4, grooves 13a and 13b are formed in both end portions of the panel member 4 which face the panel holder 5. The first pivot support 100a engages the groove 13a, and the second pivot support 100b engages the groove 13b.

Accordingly, when the panel member 4 is mounted on the panel holder 5, the second pivot support 100b is engaged with the groove 13b, so that the projection 29 is, as shown in FIG. 7, pushed in the direction of arrow C' by the inner surface of the groove 13b. As a result, the lever 25 is held in the position shown by the broken line in FIG. 7, and the switch probe 28 is pressed by the lever 25 so that the detection switch 27 is switched ON.

When the panel member 4 is removed from the panel holder 5, the projection 29, which has been pressed by groove 13b of the panel member 4, moves in the direction of arrow C so that the lever 25 pivots in the direction of arrow C thus returning to the position shown by the solid line in FIG. 7, and the detection switch 27 is thus switched OFF.

The ON/OFF signal caused by the movement of the switch probe 28 of the detection switch 27 is sent to a control circuit of the mother board 9. When the ON signal is sent from the detection switch 27, the control circuit of the mother board 9 determines that the panel member 4 is set on the main body 1 via the panel holder 5, and therefore, switches the power supply ON. On the other hand, when the OFF signal is sent from the detection switch 27, the control circuit determines that the panel member 4 is not on the main body 1 (or removed from the panel holder 5), and therefore, switches the power supply OFF.

Furthermore, as shown in FIG. 4, metal fitting members 14a and 14b which project in a perpendicular direction with respect to the panel holder 5 are installed on both sides of the panel holder 5. These metal fitting members 14a and 14b are provided so that slender cylindrical pins 14c and 14d of the metal fitting members 14a and 14b, respectively, are supported parallel to the panel holder 5. The pins 14c and 14d of these metal fitting members 14a and 14b engage with guide grooves 15a and 15b formed in both ends of the panel member 4 in a slidable fashion. Thus, when the panel member 4 is mounted on the panel holder 5, the panel member 4 is moved in the direction of arrow A so that the metal fitting members 14a and 14b engage with the guide grooves 15a and 15b; and when the panel member 4 is removed from the panel holder 5, the panel member 4 is moved in the direction of arrow A so that the metal fitting members 14a and 14b are disengaged from the guide grooves 15a and 15b.

As shown in FIG. 1, respective contact groups 16 and 17 are formed on the front surface of the inner escutcheon 2 and on the back surface of the panel member 4. The mother board 9 shown in FIG. 2 is connected to the terminal group 16 of the main body 1. The terminal group 16 of the main body 1 and the terminal group 17 of the panel member 4 are connectable to each other, so that signals can be sent and received between the control circuit of the mother board 9 and the panel member 4.

Furthermore, the panel holder 5 has a window 18a and two slits 18b and 18c. The window 18a allows the connection between the terminal group 17 of the panel member 4 and the terminal group 16 of the main body 1 to be made.

In addition, as shown in FIG. 3, a push button 19 is provided in the panel member 4 so that a part thereof projects out of the front surface of the panel member 4, and a projection 20 of the push button 19 projects out of the back surface of the panel member 4 as shown in FIG. 1. When the push button 19 is pushed, the projection 20 protrudes out of the back surface of the panel member 4 through the slit 18c.

Figure 8:
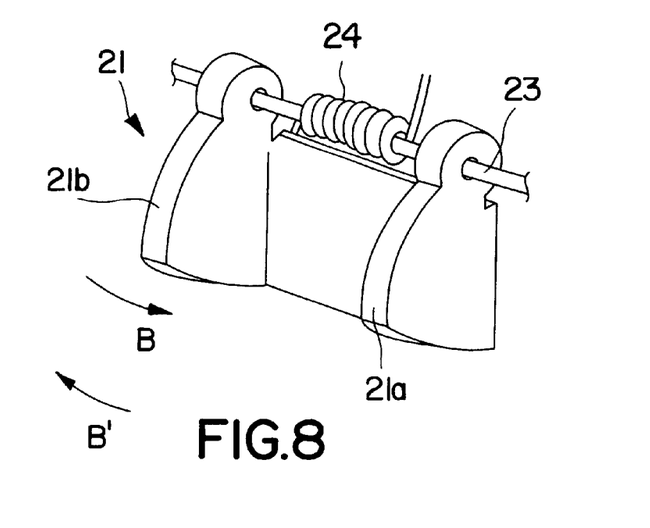
FIG. 8 is a perspective view of the locking member used in the embodiment of FIG. 1.

Furthermore, as shown in FIG. 1, a locking member 21 is provided in the main body 1. FIG. 8 shows the detail thereof. The locking member 21 includes a pair of fan-shaped contacts 21a and 21b formed at both ends thereof, and a shaft 23 is passed through the upper portions of these fan-shaped contacts 21a and 21b with a coil spring 24 mounted on the shaft 23. The coil spring 24 urges the locking member 21 in the direction of arrow B' so that the fan-shaped contacts 21a and 21b of the locking member 21 protrude to the outside through slits 22a and 22b formed in the inner escutcheon 2.

The slits 22a and 22b of the inner escutcheon 2 positionally correspond respectively to the slits 18b and 18c of the panel holder 5; therefore, the fan-shaped contacts 21a and 21b of the locking member 21 respectively correspond in position to the slits 18b and 18c of the panel holder 5. As a result, as shown in FIG. 6, the bottom edges of the slits 18b and 18c come in contact with the lower end edges of the fan-shaped contacts 21a and 21b, so that the panel holder 5 is held on the main body 1 by the spring force of the coil spring 24.

With the panel member 4 in a closed position as shown in FIG. 3, when the push button 19 is pressed so that the projection 20 of the push button 19 projects out, the projection 20 comes into contact with the fan-shaped contact 21a of the locking member 21 through the slit 18c shown in FIG. 1. As a result, the fan-shaped contact 21a, i.e., the locking member 21, is pushed in the direction of arrow B in FIG. 6 against the spring force of the spring 24. Thus, the fan-shaped contacts 21a and 21b are disengaged from the slits 18b and 18c of the panel holder 5.

The opening and closing operation of the panel member 4 and panel holder 5 of the recorded medium playback device above will be described below along with the mounting/removing operation of the panel member 4.

First, when the closed panel member 4 as shown in FIG. 3 is to be opened, the push button 19 of the panel member 4 is pressed. When the push button 19 is pressed, the projection 20 of the other end of the push button 19 as shown in FIG. 1 protrudes and presses against the locking member 21 of the main body 1 through the slit 18c of the panel holder 5. As a result, the panel holder 5 is pivoted (by the spring 24) in the direction of arrow D in FIG. 1, and the panel member 4 on the panel holder 5 is brought into an opened position. Then, a CD is inserted into the insertion opening 3, and the panel member 4 is again closed by pushing the panel member 4 in the direction of arrow D'. Afterward, the inserted CD is played by operating the operating switches (not shown) of the panel member 4. Then, when the CD is to be removed, the panel member 4 is operated in the same manner as described above, and an eject button (not shown) is operated, so that the CD is taken out of the insertion opening 3.

In this operation, when the panel member 4 is on the panel holder 5, the brackets 6a and 6b of the inner escutcheon 2 and the anchoring members 10a and 10b of the panel holder 5 are respectively kept engaged with the pivot supports 100a and 100b of the panel member 4, even if panel holder 5 (and therefore, the panel member 4) is pivoted in the directions of arrows D and D'. Meanwhile, as shown in FIG. 2, the projection 29 of the lever 25 is kept in a position in which it protrudes toward the panel member 4 in close proximity to the second pivot support 100b regardless of the opened or closed position of the panel member 4. Accordingly, as shown in FIG. 7, the projection 29 is kept pushed in the direction of arrow C by the inner surface of the groove 13b of the panel member 4, so that the lever 25 is positioned as shown by the broken line. Thus, the switch probe 28 is constantly pressed by the lever 25, and the detection switch 27 remains ON.

On the other hand, in cases where the driver leaves a vehicle, the driver removes the panel member 4 from the panel holder 5. In this case, when the panel member 4 has been in a closed (or raised) positioned as shown in FIG. 3, the panel member 4 is removed by pulling the upper portion of the panel member 4 in the direction of arrow D without pressing the push button 19. When the panel member 4 has been in an opened (or downed) position as shown in FIG. 1, it can be removed, as shown in FIG. 4, by merely pulling the panel member 4 in the direction of arrow A'.

When the panel member 4 is removed from the panel holder 5, the lever 25 returns to the position shown by the solid line because the groove 13b is disengaged from the second pivot support 100b. As a result, the switch probe 28 is released from the lever 25, and the detection switch 27 is switched OFF, so that the fact that the panel member 4 has been removed is detected by the control circuit, and the power supply of the main body 1 is switched OFF.

As seen from the above, since the power supply is switched OFF when the panel member 4 is removed from the panel holder 5, there is no need to use a connector 11 (see FIGS. 10 and 11) which forms an electrical connection between the mother board 9 and the operating section of the panel member 4 as in conventional devices. Thus, there is also no need for a part such as a flexible cable, etc. for connecting such a connector, and therefore, a corresponding reduction in the cost of parts can be achieved. Furthermore, there is no restriction of the layout of the CD mechanism part 8 by such a connector, flexible cable, etc., and it is possible to shorten the depth of the device by a corresponding amount.

Furthermore, even when the panel member 4 is opened so that a CD is inserted and removed, since the detection switch 27 can always remain ON, the power supply in the main body 1 is not cut off. Thus, in cases where a radio, etc., is installed additionally to the playback device (a CD player) described above, the power supply for the radio, etc. is not switched OFF every time a CD is removed.

In addition, since the power supply is switched OFF when the panel member 4 is removed, the danger of shorting of the terminal group 16, etc., due to the power supply that remains ON can be avoided in cases where the panel member 4 is removed when the driver leaves the vehicle.

The present invention is not limited to the embodiment described above, and other embodiments as described below are in the scope of the present invention. For example, a construction shown in FIG. 9 may be employed.

Figure 9:
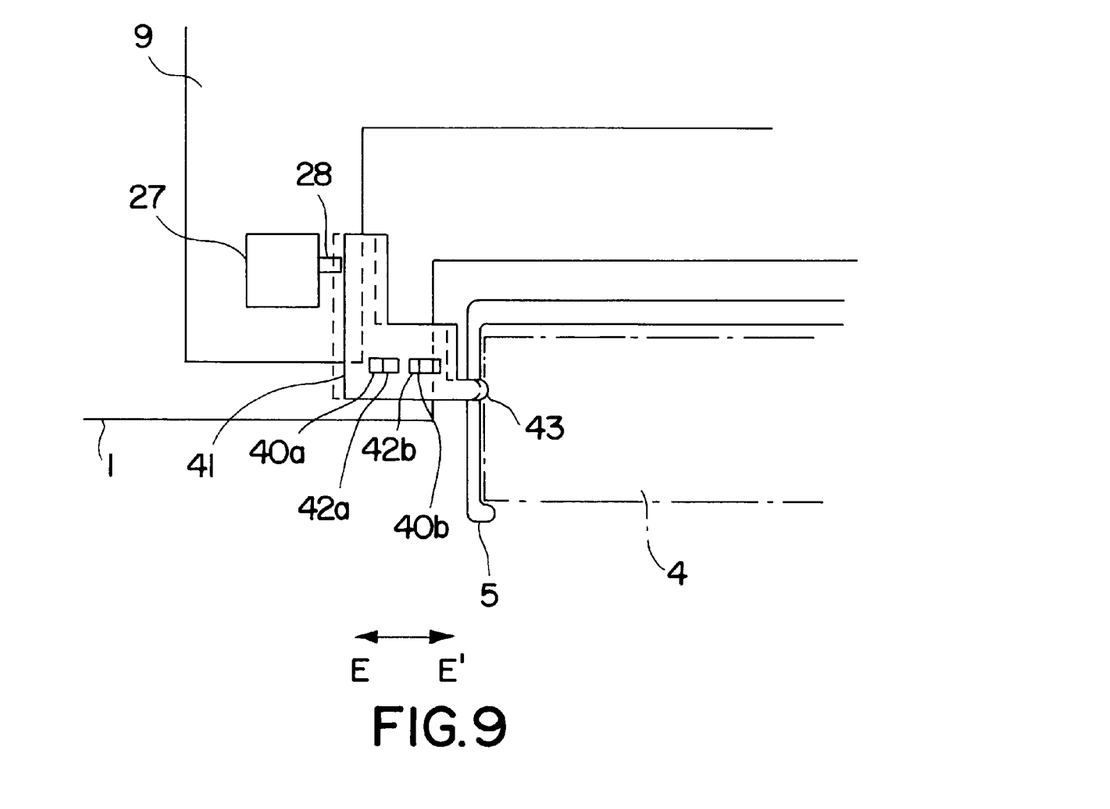
FIG. 9 is a top view of the construction of the recorded medium playback device according to another embodiment of the present invention.

In this case of FIG. 9, two pins 40a and 40b are installed on the main body 1, and slots 42a and 42b which respectively engage the pins 40a and 40b are formed in a lever 41. The lever 41 is movable in the direction of arrows E and E' within a range in which the slots 42a and 42b are regulated by the pins 40a and 40b, and a projection 43 which extends inward (toward the left in FIG. 9) from the lower portion of the panel holder 5 is provided on the lever 41.

When the panel member 4 is not on the panel holder 5, the lever 41 is held in the position shown by the solid line in FIG. 9 by the spring force of a spring (not shown). When the panel member 4 is mounted on the panel holder 5, the panel member 4 presses against the projection 43 of the lever 41 so that the lever 41 is moved in the direction of arrow E. As a result, the switch probe 28 of the detection switch 27 is pressed, and the detection switch 27 is switched ON. Then, when the panel member 4 is removed, the lever 41 returns in the direction of arrow E' by the spring (not shown), so that the detection switch 27 is switched OFF by the switch prove 28.

As seen from the above, the present invention provides a recorded medium playback device in which the cost of parts can be lower and the depth dimension can be shortened

I claim:

1. A recorded medium playback device comprising:
   a main body case having on a front face thereof an insertion opening into which a recorded medium is inserted, said main body case being provided therein with a playback mechanism which plays back said recorded medium,
   a panel member provided with an operating section on a front face thereof so as to be used to operate said playback mechanism, and
   a panel holder provided with an anchoring member for anchoring said panel member thereon, said panel holder being pivotally supported on one end of a front surface of said main body case with respect to a direction of height of said main body case so as to allow said panel member opens and closes a front of said main body case,
   said device further comprising:
      a detection switch installed inside said main body case for detecting a mounting and removal of said panel member with respect to said panel holder by way of an ON/OFF action thereof, and
      a lever movably installed in said main body case so that one end of said lever contacts said panel member anchored to said anchoring member of said panel holder and another end of said lever contacts said detection switch, so that when said panel member is anchored to the anchoring member, said lever is moved as a result of one end of said lever being contacted by said panel member, thus switching said detection switch by said another end of said lever.

2. A recorded medium playback device according to claim 1, wherein said lever is provided in said main body case by a fastening means so as to be pivotable in a horizontal direction about said fastening means.

3. A recorded medium playback device according to claim 1, wherein said lever is provided in said main case so as to be slidable in a horizontal direction.

4. A recorded medium playback device according to claim 1, wherein a projection is formed on one end of said lever so that said projection contacts said panel member while said panel member is anchored to said anchoring member of said panel holder, regardless of a pivoting motion of said panel holder.

5. A recorded medium playback device comprising:
   a main body case having on a front face thereof an insertion opening into which a recorded medium is inserted, said main body case being provided therein with a playback mechanism which plays back said recorded medium,
   a panel member provided with an operating section on a front face thereof so as to be used to operate said playback mechanism, and
   a panel holder provided with an anchoring member for anchoring said panel member thereon, said panel holder being pivotally supported on one end of a front surface of said main body case with respect to a direction of height of said main body case so as to allow said panel member to open and close a front of said main body case,
   said device further comprising:
      a first terminal group provided on a front face of said main body case,
      a second terminal group provided on a back face of said panel member, said second terminal group connectable to said first terminal group,
      a detection switch installed inside said main body case for detecting a mounting and removal of said panel member with respect to said panel holder by way of an on/off action thereof,
      a lever movably installed in said main body case so that one end of said lever contacts said panel member anchored to said anchoring member of said panel holder and another end of said lever contacts said detection switch, so that when said panel member is anchored to the anchoring member, said lever is moved as a result of one end of said lever being contacted by said panel member, thus switching said detection switch by said another end of said lever, and
      an opening formed in said panel holder so as to expose said second terminal group, and wherein
      said first terminal group and second terminal group are electrically connected when said panel member is closed while said panel member is mounted on said panel holder.

* * * * *